US010498387B2

(12) United States Patent
Uejima

(10) Patent No.: US 10,498,387 B2
(45) Date of Patent: Dec. 3, 2019

(54) HIGH-FREQUENCY FRONT-END CIRCUIT

(71) Applicant: Murata Manufacturing Co., Ltd., Kyoto (JP)

(72) Inventor: Takanori Uejima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/829,882

(22) Filed: Dec. 2, 2017

(65) Prior Publication Data

US 2018/0091187 A1 Mar. 29, 2018

Related U.S. Application Data

(63) Continuation of application No. PCT/JP2016/066103, filed on Jun. 1, 2016.

(30) Foreign Application Priority Data

Jun. 3, 2015 (JP) ................................ 2015-112817

(51) Int. Cl.
*H04W 88/02* (2009.01)
*H04B 1/56* (2006.01)
(Continued)

(52) U.S. Cl.
CPC ............. *H04B 1/56* (2013.01); *H04B 1/0057* (2013.01); *H04B 1/525* (2013.01)

(58) Field of Classification Search
None
See application file for complete search history.

(56) References Cited

U.S. PATENT DOCUMENTS

2006/0276158 A1 12/2006 Okabe
2008/0132180 A1 6/2008 Manicone
(Continued)

FOREIGN PATENT DOCUMENTS

CN 101589555 A 11/2009
CN 102684732 A 9/2012
(Continued)

OTHER PUBLICATIONS

Written Opinion for PCT/JP2016/066103 dated Aug. 23, 2016.
(Continued)

*Primary Examiner* — Brandon M Renner
(74) *Attorney, Agent, or Firm* — Pearne & Gordon LLP

(57) ABSTRACT

A high-frequency front-end circuit (10) includes a band switch (20), duplexers (31, 32, and 33), and a main switch (40). The band switch (20) includes a common terminal (PC20) and selection terminals (PS21, PS22, and PS23). The main switch (40) includes a common terminal (PC40) and selection terminals (PS41, PS42, PS43). The duplexers (31, 32, and 33) are connected between the selection terminals (PS21 and PS41), between the selection terminals (PS22 and PS42), and between the selection terminals (PS23 and PS43), respectively. The selection terminal (PS23) is connected between the selection terminals (PS21 and PS22) and the selection terminal (PS43) is connected between the selection terminals (PS41 and PS42). First and second communication bands the frequency bands of which are close to or overlapped with each other are transmitted and received through the duplexers (31 and 32).

10 Claims, 3 Drawing Sheets

(51) Int. Cl.
*H04B 1/525* (2015.01)
*H04B 1/00* (2006.01)

(56) References Cited

U.S. PATENT DOCUMENTS

| | | | | |
|---|---|---|---|---|
| 2010/0157855 | A1* | 6/2010 | Chu | H04B 1/48 370/277 |
| 2010/0291915 | A1 | 11/2010 | Nast | |
| 2011/0234295 | A1 | 9/2011 | Uejima | |
| 2012/0087282 | A1 | 4/2012 | Shibahara | |
| 2012/0208591 | A1 | 8/2012 | Uejima | |
| 2012/0224514 | A1 | 9/2012 | Shibata | |
| 2013/0163577 | A1* | 6/2013 | Feng | H04B 1/006 370/342 |
| 2013/0241666 | A1 | 9/2013 | Granger-Jones et al. | |
| 2013/0272176 | A1 | 10/2013 | Uejima | |
| 2014/0016525 | A1 | 1/2014 | Yoshizawa | |
| 2014/0044022 | A1* | 2/2014 | Matsuo | H04B 1/50 370/278 |
| 2014/0128010 | A1* | 5/2014 | Kim | H04B 1/0458 455/84 |
| 2014/0179364 | A1 | 6/2014 | Kitajima | |
| 2015/0326326 | A1* | 11/2015 | Nobbe | H04B 17/12 375/224 |

FOREIGN PATENT DOCUMENTS

| | | | |
|---|---|---|---|
| CN | 103178791 | A | 6/2013 |
| JP | 2003-008470 | A | 1/2003 |
| JP | 2005-260877 | A | 9/2005 |
| JP | 2006-340257 | A | 12/2006 |
| JP | 2009-038807 | A | 2/2009 |
| JP | 2010-511353 | A | 4/2010 |
| JP | 2012-044290 | A | 3/2012 |
| JP | 2012-080160 | A | 4/2012 |
| JP | 5136532 | B2 | 2/2013 |
| JP | 2014-017764 | A | 1/2014 |
| KR | 10-2012-0027588 | A | 3/2013 |
| WO | 2011/001769 | A1 | 1/2011 |
| WO | 2012/093539 | A1 | 7/2012 |
| WO | 2012/176401 | A1 | 12/2012 |

OTHER PUBLICATIONS

International Search Report for PCT/JP2016/066103 dated Aug. 23, 2016.

Korean Office Action for Application No. 10-2017-7031581, dated Sep. 12, 2018.

* cited by examiner

【FIG.1】
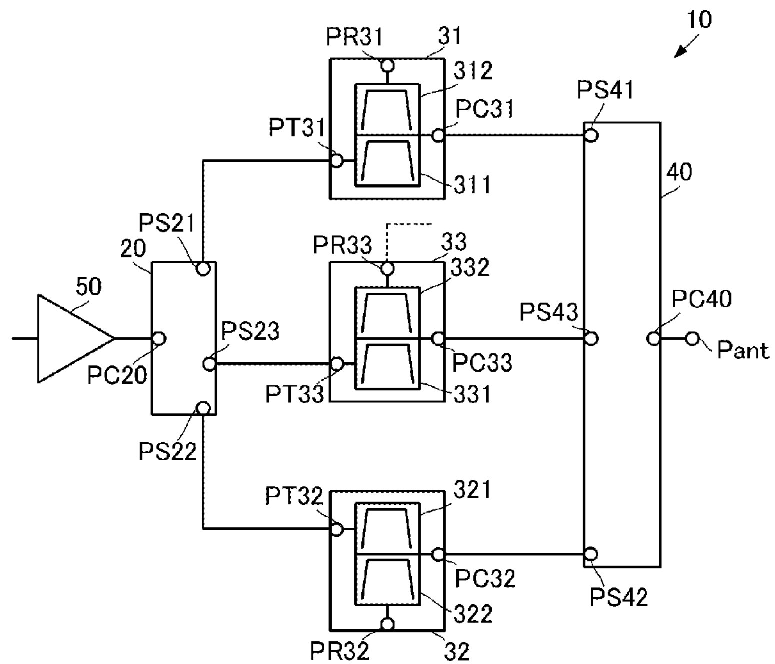
【FIG.2】
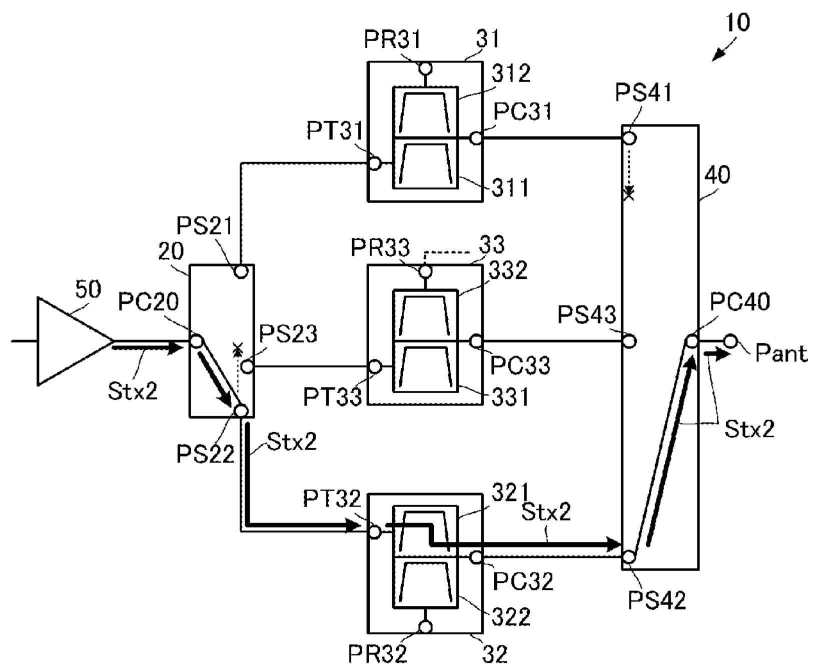

【FIG.3】
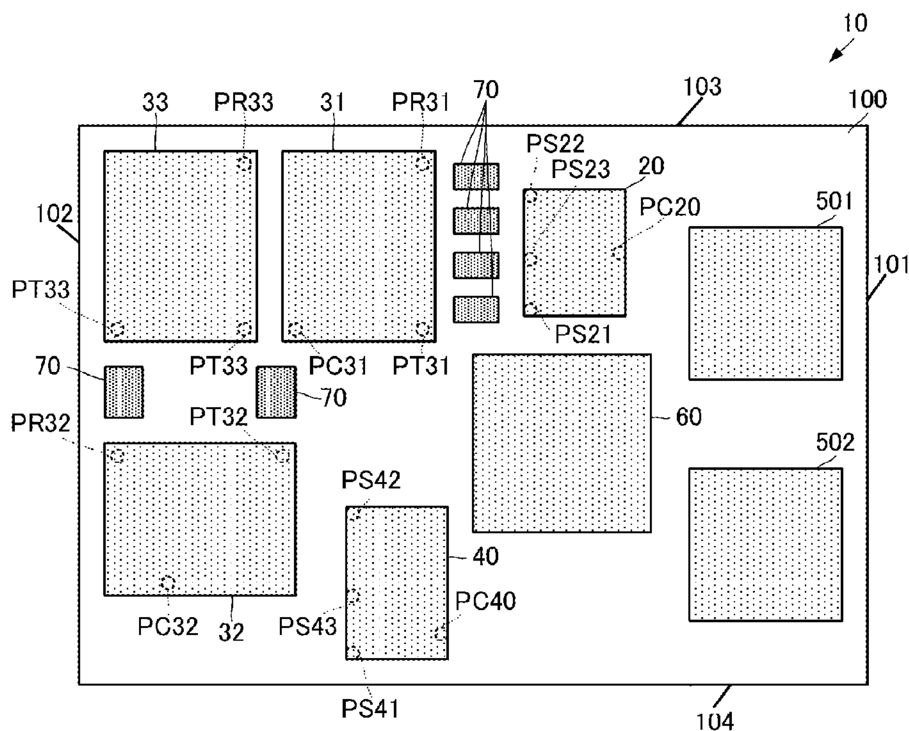
【FIG.4】
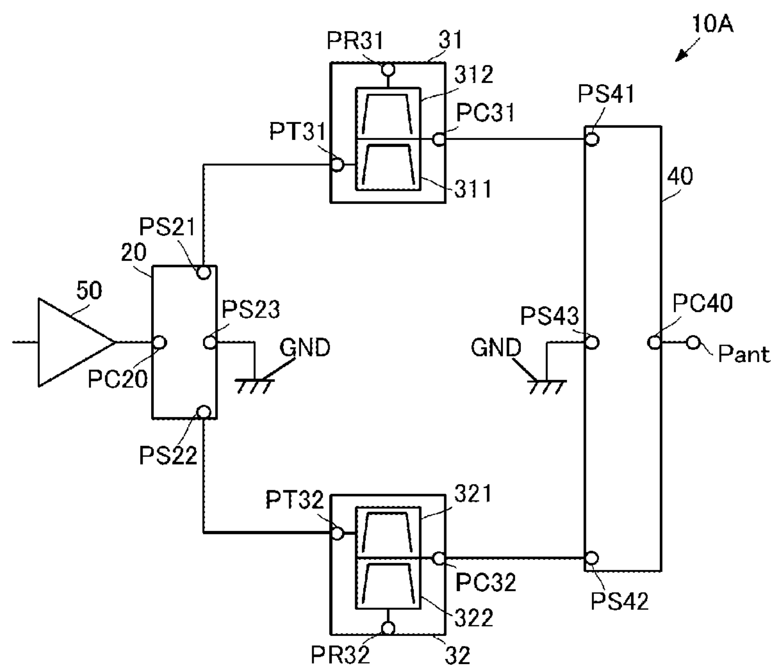

【FIG.5】
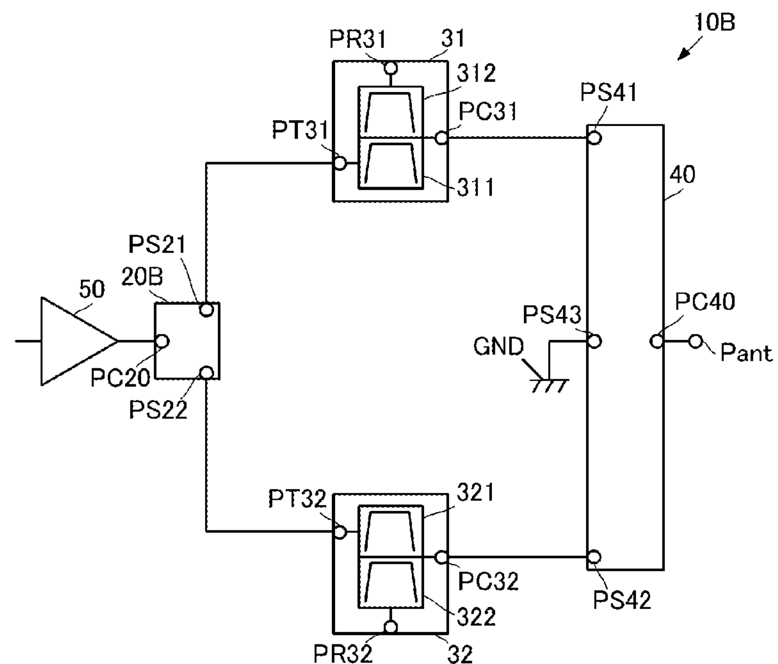
【FIG.6】
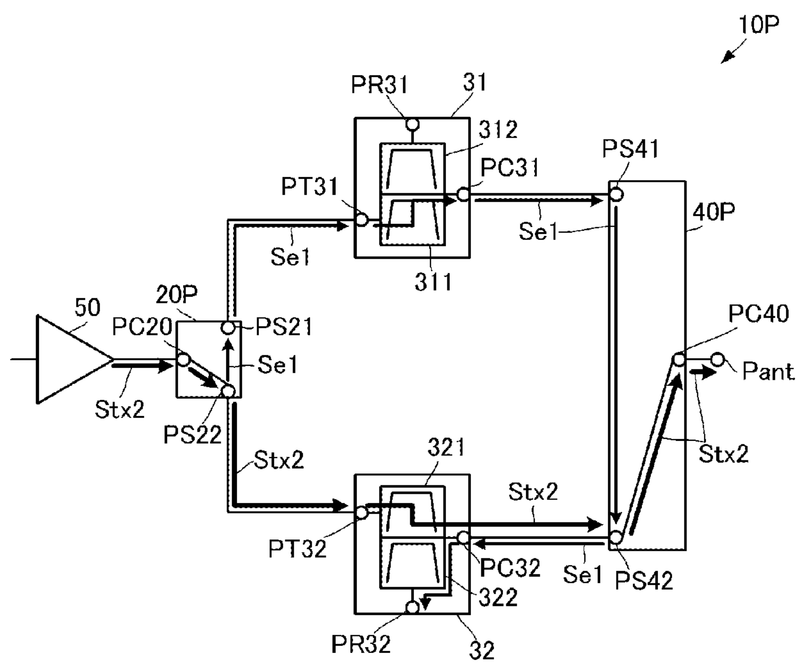

HIGH-FREQUENCY FRONT-END CIRCUIT

This is a continuation of International Application No. PCT/JP2016/066103 filed on Jun. 1, 2016 which claims priority from Japanese Patent Application No. JP 2015-112817 filed on Jun. 3, 2015. The contents of these applications are incorporated herein by reference in their entireties.

BACKGROUND OF THE DISCLOSURE

Field of the Disclosure

The present disclosure relates to a high-frequency front-end circuit that is connected to an antenna that transmits and receives high-frequency signals in multiple communication bands and that has a demultiplexing function.

Description of the Related Art

Various apparatuses that transmit and receive high-frequency signals in multiple communication bands using an antenna commonly used for the communication bands have heretofore been devised. Such an apparatus includes a high-frequency front-end circuit having a function to demultiplex high-frequency signals that are transmitted and received using the antenna into signals in the respective communication bands.

As a high-frequency front-end circuit in related art, for example, as disclosed in Patent Document 1, a high-frequency switch module having a configuration in which communication bands for transmission and reception are switched using a switch is put to practical use.

Patent Document 1: Japanese Patent No. 5136532

BRIEF SUMMARY OF THE DISCLOSURE

However, the high-frequency front-end circuit using a switch described above may have the following problems.

FIG. 6 is a diagram for describing challenges in a high-frequency front-end circuit in the related art. As illustrated in FIG. 6, a high-frequency front-end circuit 10P in the related art includes a band switch 20P, duplexers 31 and 32, a main switch 40P, and a multi-band power amplifier 50.

The band switch 20P has a common terminal PC20 and selection terminals PS21 and PS22. The selection terminals PS21 and PS22 are selectively connected to the common terminal PC20. The common terminal PC20 is connected to an output terminal of the power amplifier 50. The selection terminal PS21 is connected to the duplexer 31 and the selection terminal PS22 is connected to the duplexer 32.

The duplexer 31 includes a transmission filter 311 and a reception filter 312. The duplexer 31 has a transmission terminal PT31, a reception terminal PR31, and an antenna terminal PC31. The transmission filter 311 is connected between the transmission terminal PT31 and the antenna terminal PC31. The reception filter 312 is connected between the reception terminal PR31 and the antenna terminal PC31. The transmission terminal PT31 is connected to the selection terminal PS21 of the band switch 20P.

The duplexer 32 includes a transmission filter 321 and a reception filter 322. The duplexer 32 has a transmission terminal PT32, a reception terminal PR32, and an antenna terminal PC32. The transmission filter 321 is connected between the transmission terminal PT32 and the antenna terminal PC32. The reception filter 322 is connected between the reception terminal PR32 and the antenna terminal PC32. The transmission terminal PT32 is connected to the selection terminal PS22 of the band switch 20P.

The main switch 40P has a common terminal PC40 and selection terminals PS41 and PS42. The selection terminals PS41 and PS42 are selectively connected to the common terminal PC40. The selection terminal PS41 is connected to the antenna terminal PC31 of the duplexer 31. The selection terminal PS42 is connected to the antenna terminal PC32 of the duplexer 32.

The high-frequency front-end circuit 10P connects the common terminal PC20 to the selection terminal PS21 in the band switch 20P and connects the common terminal PC40 to the selection terminal PS41 in the main switch 40P in transmission and reception in a first communication band. The high-frequency front-end circuit 10P connects the common terminal PC20 to the selection terminal PS22 in the band switch 20P and connects the common terminal PC40 to the selection terminal PS42 in the main switch 40P in transmission and reception in a second communication band.

In such a configuration, the frequency band of the first communication band is overlapped with or close to the frequency band of the second communication band. In transmission of a transmission signal in the second communication band, a transmission signal Stx2 outputted from the power amplifier 50 is transmitted to an antenna connection terminal Pant through the band switch 20P, the duplexer 32, and the main switch 40P.

However, when high isolation is not ensured in the second communication band between the selection terminals PS21 and PS22 of the band switch 20P, part of the transmission signal Stx2 leaks from the selection terminal PS22 into the selection terminal PS21 (a leakage signal Se1).

Overlapping of the frequency band of the first communication band with the frequency band of the second communication band or making the frequency band of the first communication band close to the frequency band of the second communication band causes the pass band of the transmission filter 311 in the duplexer 31 to be overlapped with or close to the pass band of the transmission filter 321 in the duplexer 32. Accordingly, the leakage signal Se1 passes through the duplexer 31 and is transmitted to the selection terminal PS41 of the main switch 40P.

In addition, when high isolation is not ensured in the second communication band between the selection terminals PS41 and PS42 of the main switch 40P, the leakage signal Se1 leaks from the selection terminal PS41 into the selection terminal PS42. The leakage signal Se1 leaking into the selection terminal PS42 is transmitted to the antenna terminal PC32 of the duplexer 32.

If the transmission frequency of the second communication band is overlapped with the reception frequency thereof or the transmission frequency of the second communication band is close to the reception frequency thereof here, the leakage signal Se1 is not capable of being sufficiently attenuated in the reception filter 322 in the duplexer 32. Accordingly, the leakage signal Se1 is transmitted to the reception terminal PR32. This degrades the reception sensitivity of the second communication band.

It is an object of the present disclosure to realize a high-frequency front-end circuit capable of suppressing degradation of the reception sensitivity also in a mode in which multiple high-frequency signals the communication bands of which are close to each other or overlapped with each other are transmitted and received.

The present disclosure provides a high-frequency front-end circuit including a band switch, a main switch, and first and second duplexers. The band switch includes a band switch common terminal, a first band switch selection terminal, and a second band switch selection terminal. The first band switch selection terminal and the second band switch selection terminal are selectively connected to the band switch common terminal. The main switch includes a main switch common terminal, a first main switch selection terminal, and a second main switch selection terminal. The first main switch selection terminal and the second main switch selection terminal are selectively connected to the main switch common terminal. The first duplexer includes a first transmission filter and a first reception filter and transmits and receives a high-frequency signal in a first communication band. The second duplexer includes a second transmission filter and a second reception filter and transmits and receives a high-frequency signal in a second communication band. The frequency band of the first communication band is overlapped with or close to the frequency band of the second communication band. The first transmission filter is connected between the first band switch selection terminal and the first main switch selection terminal. The second transmission filter is connected between the second band switch selection terminal and the second main switch selection terminal. The band switch includes a third band switch selection terminal provided between the first band switch selection terminal and the second band switch selection terminal or the main switch includes a third main switch selection terminal provided between the first main switch selection terminal and the second main switch selection terminal. A load circuit for a transmission signal in the second communication band is connected to the third band switch selection terminal or the third main switch selection terminal that is provided.

With the above configuration, the leakage of the transmission signal in the second communication band between the first band switch selection terminal and the second band switch selection terminal or the leakage of the transmission signal in the second communication band between the first main switch selection terminal and the second main switch selection terminal is suppressed. Accordingly, the leakage signal of the transmission signal in the second communication band, which is transmitted to the reception terminal of the second duplexer via the band switch, the first duplexer, and the main switch, is suppressed.

The high-frequency front-end circuit of the present disclosure preferably has the following configuration. The band switch includes a third band switch selection terminal provided between the first band switch selection terminal and the second band switch selection terminal. In addition, the main switch includes a third main switch selection terminal provided between the first main switch selection terminal and the second main switch selection terminal. The load circuit is connected to the third band switch selection terminal and the third main switch selection terminal.

With the above configuration, since a function to suppress the leakage signal is provided for both the band switch and the main switch, the leakage signal is more effectively suppressed.

In the high-frequency front-end circuit of the present disclosure, the load circuit may be a ground connection circuit.

With the above configuration, it is possible to cause the leakage signal to flow into the ground to more effectively suppress transmission of the leakage signal to the reception terminal.

In the high-frequency front-end circuit of the present disclosure, the load circuit may be a third duplexer that is connected between the third band switch selection terminal and the third main switch selection terminal and that transmits and receives a third communication band.

With the above configuration, transmission of the leakage signal to the reception terminal is capable of being suppressed while transmission and reception in the third communication band, which is different from the first and second communication bands, is enabled.

The high-frequency front-end circuit of the present disclosure preferably has the following configuration. The first duplexer and the second duplexer are surface mount devices and are mounted on a circuit board. A reception terminal of the first reception filter is arranged so as to be close to a first side of the circuit board. A reception terminal of the second reception filter is arranged so as to be close to a second side of the circuit board. The reception terminal of the first reception filter is on the side of the first side, compared with a transmission terminal of the first transmission filter. The reception terminal of the second reception filter is on the side of the second side, compared with a transmission terminal of the second transmission filter.

With the above configuration, since the reception terminal is arranged near an outer side of the circuit board, compared with the transmission terminal, the distance between the transmission path of the transmission signal and the reception terminal is increased to further suppress transmission of the leakage signal to the reception terminal.

According to the present disclosure, it is possible to suppress the degradation of the reception sensitivity also in a mode in which multiple high-frequency signals the communication bands of which are close to each other or overlapped with each other are transmitted and received.

BRIEF DESCRIPTION OF THE SEVERAL VIEWS OF THE DRAWINGS

FIG. 1 is a circuit diagram of a high-frequency front-end circuit according to a first embodiment of the present disclosure.

FIG. 2 is a circuit diagram for describing the effects and advantages of the high-frequency front-end circuit according to the first embodiment of the present disclosure.

FIG. 3 is a plan view illustrating a component configuration of the high-frequency front-end circuit according to the first embodiment of the present disclosure.

FIG. 4 is a circuit diagram of a high-frequency front-end circuit according to a second embodiment of the present disclosure.

FIG. 5 is a circuit diagram of a high-frequency front-end circuit according to a third embodiment of the present disclosure.

FIG. 6 is a diagram for describing the challenges in a high-frequency front-end circuit in the related art.

DETAILED DESCRIPTION OF THE DISCLOSURE

A high-frequency front-end circuit according to a first embodiment of the present disclosure will herein be described with reference to the drawings. FIG. 1 is a circuit diagram of the high-frequency front-end circuit according to the first embodiment of the present disclosure.

As illustrated in FIG. 1, a high-frequency front-end circuit 10 includes a band switch 20, duplexers 31, 32, and 33, a main switch 40, and a multi-band power amplifier 50. The duplexer 31 corresponds to a first duplexer of the present disclosure, the duplexer 32 corresponds to a second duplexer of the present disclosure, and the duplexer 33 corresponds to a third duplexer of the present disclosure.

The band switch 20 is composed of, for example, a semiconductor switch. The band switch 20 has a common terminal PC20 and selection terminals PS21, PS22, and PS23. The band switch 20 selectively connects the selection terminals PS21, PS22, and PS23 to the common terminal PC20 in response to a control signal that is supplied externally. The common terminal PC20 corresponds to a band switch common terminal of the present disclosure, the selection terminal PS21 corresponds to a first band switch selection terminal of the present disclosure, the selection terminal PS22 corresponds to a second band switch selection terminal of the present disclosure, and the selection terminal PS23 corresponds to a third band switch selection terminal of the present disclosure.

The common terminal PC20 is connected to an output terminal of the power amplifier 50. The selection terminal PS21 is connected to the duplexer 31 and the selection terminal PS22 is connected to the duplexer 32. The selection terminal PS23 is connected to the duplexer 33. The selection terminal PS23 is arranged between the selection terminal PS21 and the selection terminal PS22.

The duplexer 31 includes a transmission filter 311 and a reception filter 312. The transmission filter 311 corresponds to a first transmission filter of the present disclosure and the reception filter 312 corresponds to a first reception filter of the present disclosure. The duplexer 31 has a transmission terminal PT31, a reception terminal PR31, and an antenna terminal PC31. The transmission filter 311 is connected between the transmission terminal PT31 and the antenna terminal PC31. The reception filter 312 is connected between the reception terminal PR31 and the antenna terminal PC31. The transmission terminal PT31 is connected to the selection terminal PS21 of the band switch 20.

The transmission filter 311 is a filter including the frequency band of a transmission signal in a first communication band in a pass band. The reception filter 312 is a filter including the frequency band of a reception signal in the first communication band in the pass band.

The duplexer 32 includes a transmission filter 321 and a reception filter 322. The transmission filter 321 corresponds to a second transmission filter of the present disclosure and the reception filter 322 corresponds to a second reception filter of the present disclosure. The duplexer 32 has a transmission terminal PT32, a reception terminal PR32, and an antenna terminal PC32. The transmission filter 321 is connected between the transmission terminal PT32 and the antenna terminal PC32. The reception filter 322 is connected between the reception terminal PR32 and the antenna terminal PC32. The transmission terminal PT32 is connected to the selection terminal PS22 of the band switch 20.

The transmission filter 321 is a filter including the frequency band of a transmission signal in a second communication band in the pass band. The reception filter 322 is a filter including the frequency band of a reception signal in the second communication band in the pass band.

The duplexer 33 includes a transmission filter 331 and a reception filter 332. The duplexer 33 has a transmission terminal PT33, a reception terminal PR33, and an antenna terminal PC33. The transmission filter 331 is connected between the transmission terminal PT33 and the antenna terminal PC33. The reception filter 332 is connected between the reception terminal PR33 and the antenna terminal PC33. The transmission terminal PT33 is connected to the selection terminal PS23 of the band switch 20.

The transmission filter 331 is a filter including the frequency band of a transmission signal in a third communication band in the pass band. The reception filter 332 is a filter including the frequency band of a reception signal in the third communication band in the pass band.

The main switch 40 is composed of, for example, a semiconductor switch. The main switch 40 has a common terminal PC40 and selection terminals PS41, PS42, and PS43. The main switch 40 selectively connects the selection terminals PS41, PS42, and PS43 to the common terminal PC40 in response to a control signal that is supplied externally. The common terminal PC40 corresponds to a main switch common terminal of the present disclosure, the selection terminal PS41 corresponds to a first main switch selection terminal of the present disclosure, the selection terminal PS42 corresponds to a second main switch selection terminal of the present disclosure, and the selection terminal PS43 corresponds to a third main switch selection terminal of the present disclosure.

The common terminal PC40 is connected to an antenna connection terminal Pant of the high-frequency front-end circuit 10. The selection terminal PS41 is connected to the antenna terminal PC31 of the duplexer 31. The selection terminal PS42 is connected to the antenna terminal PC32 of the duplexer 32. The selection terminal PS43 is connected to the antenna terminal PC33 of the duplexer 33. The selection terminal PS43 is arranged between the selection terminal PS41 and the selection terminal PS42.

In transmission and reception in the first communication band, the common terminal PC20 is connected to the selection terminal PS21 of the band switch 20. Simultaneously, the common terminal PC40 is connected to the selection terminal PS41 of the main switch 40.

In transmission and reception in the second communication band, the common terminal PC20 is connected to the selection terminal PS22 of the band switch 20. Simultaneously, the common terminal PC40 is connected to the selection terminal PS42 of the main switch 40.

In transmission and reception in the third communication band, the common terminal PC20 is connected to the selection terminal PS23 of the band switch 20. Simultaneously, the common terminal PC40 is connected to the selection terminal PS43 of the main switch 40.

FIG. 2 is a circuit diagram for describing the effects and advantages of the high-frequency front-end circuit according to the first embodiment of the present disclosure.

Upon selection of transmission and reception in the second communication band, the selection terminal PS22 is selected in the band switch 20 and the selection terminal PS42 is selected in the main switch 40, as described above. As a result, as illustrated in FIG. 2, a transmission signal Stx2 in the second communication band, which is outputted from the power amplifier 50, is transmitted to the antenna connection terminal Pant through the band switch 20, the transmission filter 321 in the duplexer 32, and the main switch 40. A reception signal in the second communication band, which is inputted through the antenna connection terminal Pant, is transmitted to the reception terminal PR32 through the main switch 40 and the reception filter 322 in the duplexer 32. A transmission path through the duplexer 31 is selected in transmission and reception in the first communication band and a transmission path through the duplexer 33 is selected in transmission and reception in the third communication band. As described above, appropriate switching control of the band switch 20 and the main switch 40 enables the high-frequency front-end circuit 10 to realize transmission and reception in the first, second, and third communication bands using a common antenna (not illustrated) connected to the antenna connection terminal Pant.

In the above configuration, the frequency band of the first communication band may be overlapped with or close to the frequency band of the second communication band. In this case, the frequency band of the third communication band is set so as to be spaced from the frequency band of the first communication band and the frequency band of the second communication band in the high-frequency front-end circuit 10. The interval between the frequency bands of the third communication band and the first communication band and the interval of the frequency band of the third communication band are longer than the interval between the frequency bands of the first communication band and the second communication band. The frequency bands of the first and second communication bands are preferably included in a stop band of the third communication band.

As described above, in the band switch 20, the selection terminal PS23 for the third communication band is arranged between the selection terminal PS22 for the second communication band and the selection terminal PS21 for the first communication band. Accordingly, the leakage of the transmission signal Stx2 from the selection terminal PS22 into the selection terminal PS21 is suppressed by the selection terminal PS23.

In the main switch 40, the selection terminal PS43 for the third communication band is arranged between the selection terminal PS42 for the second communication band and the selection terminal PS41 for the first communication band. Accordingly, the leakage from the selection terminal PS41 into the selection terminal PS42 is suppressed by the selection terminal PS43.

Transmission of the leakage signal of the transmission signal Stx2 to the antenna terminal PC32 of the duplexer 32 along a path through the band switch 20, the duplexer 31, and the main switch 40 is suppressed in the above manner.

If the transmission frequency band of the second communication band is close to the reception frequency band thereof, the leakage signal of the transmission signal Stx2, inputted through the antenna terminal PC32, is not capable of being sufficiently attenuated in the reception filter 322.

However, the transmission of the leakage signal of the transmission signal Stx2 to the antenna terminal PC32 in the duplexer 32 is suppressed in the above manner in the high-frequency front-end circuit 10. Accordingly, almost no leakage signal through the duplexer 31 side occurs in the high-frequency front-end circuit 10 and the transmission of the leakage signal of the transmission signal Stx2 to the reception terminal PR32 is capable of being suppressed. As a result, it is possible to suppress a reduction in the reception sensitivity of the second communication band.

In addition, the suppression of the leakage of the transmission signal Stx2 enables the transmission loss of the transmission signal to be suppressed.

The high-frequency front-end circuit 10 having the above configuration is realized by a component configuration illustrated in FIG. 3. FIG. 3 is a plan view illustrating the component configuration of the high-frequency front-end circuit according to the first embodiment of the present disclosure.

As illustrated in FIG. 3, the high-frequency front-end circuit 10 includes a rectangular circuit board 100 in plan view. The circuit board 100 is composed of, for example, a multilayer body in which dielectric layers are laminated. Conductor patterns for realizing the high-frequency front-end circuit 10 are formed on the dielectric layers.

A high-output power amplifier 501 and a low-output power amplifier 502, which compose the band switch 20, the duplexers 31, 32, and 33, the main switch 40, and the power amplifier 50, and a control integrated circuit (IC) 60 are surface mount devices. At least a part of passive elements (for example, an inductor, a capacitor, and a resistor) 70 for matching and so on, which are not illustrated in FIG. 1, is also a surface mount device.

The band switch 20, the duplexers 31, 32, and 33, the main switch 40, the high-output power amplifier 501, the low-output power amplifier 502, the control IC 60, and the passive elements 70 are mounted on the surface of the circuit board 100.

The high-output power amplifier 501 and the low-output power amplifier 502 are mounted near a side 101 of the circuit board 100.

The duplexers 31, 32, and 33 are mounted in a substantially half area on the side of a side 102 of the circuit board 100. The side 102 is opposed to the side 101. The duplexers 31 and 33 are arranged in an area on the side of a side 103 of the circuit board 100. The side 103 is orthogonal to the sides 101 and 102. The duplexers 31 and 33 are arranged along the side 103 and the duplexer 33 is arranged near the side of the side 102, compared with the duplexer 31. The duplexer 32 is arranged in an area on the side of a side 104 of the circuit board 100. The side 104 is orthogonal to the sides 101 and 102 and is opposed to the side 103. The duplexer 32 is arranged along the side 102 with the duplexer 33. With this configuration, the duplexer 32 and the duplexer 31 are arranged so as to be spaced from each other. In addition, the passive elements 70 are arranged between the duplexer 32 and the duplexers 31 and 33. Electrical coupling and electromagnetic coupling between the duplexer 32 and the duplexer 31 are suppressed with the above configuration.

The reception terminal PR31 of the duplexer 31 is arranged near the side 103 (corresponds to a first side of the present disclosure) and the transmission terminal PT31 is arranged on the center side of the circuit board 100. In other words, the reception terminal PR31 is arranged near an outer side of the circuit board 100, compared with the transmission terminal PT31.

The reception terminal PR32 of the duplexer 32 is arranged near the side 102 (corresponds to a second side of the present disclosure) and the transmission terminal PT32 is arranged on the center side of the circuit board 100. In other words, the reception terminal PR32 is arranged near an outer side of the circuit board 100, compared with the transmission terminal PT32.

The reception terminal PR33 of the duplexer 33 is arranged near the side 103 and the transmission terminal PT33 is arranged on the center side of the circuit board 100. In other words, the reception terminal PR33 is arranged near an outer side of the circuit board 100, compared with the transmission terminal PT33.

With the above configuration, the transmission path of the transmission signal is spaced from the respective reception terminals PR31, PR32, and PR33. This suppresses the direct leakage of the transmission signal into the reception terminal PR32 (the same applies to the reception terminals PR31 and PR33). In addition, in the configuration illustrated in FIG. 3, the respective transmission terminals PT31, PT32, and PT33 are arranged on the band switch 20 side of the duplexers 31, 32, and 33, respectively. Accordingly, the wiring paths between the band switch 20 and the respective duplexers 31, 32, and 33 are made short, the coupling with the respective reception terminals PR31, PR32, and PR33 is suppressed, and the transmission signal is capable of being transmitted with low loss.

The band switch 20 and the control IC 60 are arranged between the duplexer 31 and an area where the high-output power amplifier 501 and the low-output power amplifier 502 are arranged. The band switch 20 is arranged on the side of the side 103, compared with the control IC 60.

The selection terminals PS21, PS22, and PS23 of the band switch 20 are arranged along one side of the band switch 20, as illustrated in FIG. 3. The selection terminal PS23 is arranged between the selection terminals PS21 and PS22. This realizes the circuit configuration described above to suppress the leakage from the selection terminal PS22 into the selection terminal PS21.

The common terminal PC20 of the band switch 20 is arranged on the side of the high-output power amplifier 501 and the low-output power amplifier 502. The selection terminals PS21, PS22, and PS23 of the band switch 20 are arranged on the side of the duplexers 31, 32, and 33. With this configuration, the wiring located on the side of the power amplifier 50 with respect to the band switch 20 does not get close to the wiring located on the side of the duplexers 31, 32, and 33 with respect to the band switch 20. This enables the direct leakage from the power amplifier 50 side into the duplexer 31 to be suppressed. Accordingly, it is possible to further suppress the leakage signal. In addition, each wiring is capable of being shortened and the transmission loss is capable of being reduced. In other words, the coupling between the conductor that connects the selection terminal PS22 of the band switch 20 to the transmission terminal PT32 of the duplexer 32 and the conductor that connects the selection terminal PS21 of the band switch 20 to the transmission terminal PT31 of the duplexer 31 is capable of being suppressed to suppress transmission of the leakage signal to the reception terminal PR32. These conductors are preferably formed on different layers of the circuit board 100 so that the conductors are not overlapped with each other in plan view of the circuit board 100.

The main switch 40 is arranged between the control IC 60 and the duplexer 32. The selection terminals PS41, PS42, and PS43 of the main switch 40 are arranged along one side of the main switch 40, as illustrated in FIG. 3. The selection terminal PS43 is arranged between the selection terminals PS41 and PS42. This realizes the circuit configuration described above to suppress the leakage from the selection terminal PS41 into the selection terminal PS42.

The selection terminals PS41, PS42, and PS43 of the main switch 40 are arranged on the side of the duplexers 31, 32, and 33. This configuration enables each wiring to be shortened and enables the transmission loss to be reduced. Accordingly, the coupling between the conductor that connects the antenna terminal PC32 of the duplexer 32 to the selection terminal PS42 of the main switch 40 and the conductor that connects the antenna terminal PC31 of the duplexer 31 to the selection terminal PS41 of the main switch 40 is capable of being suppressed to suppress transmission of the leakage signal to the reception terminal PR32. These conductors are preferably formed on different layers of the circuit board 100 so that the conductors are not overlapped with each other in plan view of the circuit board 100.

A high-frequency front-end circuit according to a second embodiment of the present disclosure will herein be described with reference to the drawing. FIG. 4 is a circuit diagram of the high-frequency front-end circuit according to the second embodiment of the present disclosure.

A high-frequency front-end circuit 10A according to the present embodiment differs from the high-frequency front-end circuit 10 according to the first embodiment in the configuration of connection to the selection terminal PS23 and the configuration of connection to the selection terminal PS43.

The duplexer 33 is omitted in the high-frequency front-end circuit 10A. The selection terminal PS23 is connected to ground GND. The selection terminal PS43 is connected to the ground GND. The selection terminals PS23 and PS43 may be directly connected to the ground GND or may be matched at 50Ω and connected to the ground. Also with this configuration, it is possible to suppress transmission of the leakage signal of the transmission signal Stx2 to the reception terminal PR32 of the duplexer 32 through the duplexer 31 side. In addition, in the present embodiment, no provision of the duplexer 33 enables the high-frequency front-end circuit 10A to be formed in a smaller size.

The ground GND to which the selection terminal PS23 is connected and the ground GND to which the selection terminal PS43 is connected are preferably different ground conductors of the circuit board. This enables leakage via the ground GND to be suppressed.

A high-frequency front-end circuit according to a third embodiment of the present disclosure will herein be described with reference to the drawing. FIG. 5 is a circuit diagram of the high-frequency front-end circuit according to the third embodiment of the present disclosure.

A high-frequency front-end circuit 10B according to the present embodiment differs from the high-frequency front-end circuit 10A according to the second embodiment in the configuration of a band switch 20B.

The band switch 20B includes the common terminal PC20 and the selection terminals PS21 and PS22. In other words, the band switch 20B has a configuration in which the selection terminal PS23 is omitted in the band switch 20.

Also with this configuration, since transmission of the leakage signal between the selection terminal PS41 and the selection terminal PS42 is suppressed in the main switch 40, the same advantages as those of the high-frequency front-end circuit 10A according to the second embodiment are achieved. In addition, in the present embodiment, the band switch 20B is capable being formed in a size smaller than that of the band switch 20. This enables the size of the high-frequency front-end circuit 10B to be further reduced.

Although a specific configuration is not illustrated in the above description, matching circuits may be provided between the band switch 20 or 20B and the duplexer 31, between the duplexer 31 and the main switch 40, between the band switch 20 or 20B and the duplexer 32, and between the duplexer 32 and the main switch 40, if needed. In the mode including such matching circuits, a matching circuit for the first communication band, which is connected between the band switch 20 or 20B and the duplexer 31 and between the duplexer 31 and the main switch 40, is preferably arranged so as to be spaced from a matching circuit for the second communication band, which is connected between the band switch 20 or 20B and the duplexer 32 and between the duplexer 32 and the main switch 40. This enables transmission of the leakage signal due to the coupling between the matching circuits to be suppressed.

10, 10A, 10B high-frequency front-end circuit
20, 20B band switch
31, 32, 33 duplexer
40 main switch
50 power amplifier
60 control IC

70 passive element
100 circuit board
101, 102, 103, 104 side
311, 321, 331 transmission filter
312, 322, 332 reception filter
501 high-output power amplifier
502 low-output power amplifier
PC20 common terminal
PS21, PS22, PS23 selection terminal
PC40 common terminal
PS41, PS42, PS43 selection terminal
PT31, PT32, PT33 transmission terminal
PR31, PR32, PR33 reception terminal
PC31, PC32, PC33 antenna terminal
Pant antenna connection terminal

The invention claimed is:

1. A high-frequency front-end circuit comprising:

a band switch comprising a band switch common terminal, a first band switch selection terminal, and a second band switch selection terminal, wherein the first band switch selection terminal and the second band switch selection terminal are selectively connected to the band switch common terminal;

a main switch comprising a main switch common terminal, a first main switch selection terminal, and a second main switch selection terminal, wherein the first main switch selection terminal and the second main switch selection terminal are selectively connected to the main switch common terminal;

a first duplexer comprising a first transmission filter and a first reception filter, and that is configured to transmit and receive a high-frequency signal in a first communication band; and a second duplexer comprising a second transmission filter and a second reception filter, and that is configured to transmit and receive a high-frequency signal in a second communication band, wherein a frequency band of the first communication band is overlapped with or close to a frequency band of the second communication band, wherein the first transmission filter is connected between the first band switch selection terminal and the first main switch selection terminal, wherein the second transmission filter is connected between the second band switch selection terminal and the second main switch selection terminal, wherein the band switch further comprises a third band switch selection terminal provided between the first band switch selection terminal and the second band switch selection terminal, or the main switch further comprises a third main switch selection terminal provided between the first main switch selection terminal and the second main switch selection terminal, and wherein a load circuit is connected to the third band switch selection terminal or the third main switch selection terminal.

2. The high-frequency front-end circuit according to claim 1, wherein the band switch further comprises a third band switch selection terminal provided between the first band switch selection terminal and the second band switch selection terminal, wherein the main switch further comprises a third main switch selection terminal provided between the first main switch selection terminal and the second main switch selection terminal, and wherein the load circuit is connected to the third band switch selection terminal and the third main switch selection terminal.

3. The high-frequency front-end circuit according to claim 1, wherein the load circuit is a ground connection circuit.

4. The high-frequency front-end circuit according to claim 2, wherein the load circuit is a ground connection circuit.

5. The high-frequency front-end circuit according to claim 2, wherein the load circuit comprises a third duplexer that is connected between the third band switch selection terminal and the third main switch selection terminal and that is configured to transmit and receive a high-frequency signal in a third communication band.

6. The high-frequency front-end circuit according to claim 1, wherein the first duplexer and the second duplexer are surface mount devices and are mounted on a circuit board, wherein a reception terminal of the first reception filter is closer to a first side of the circuit board than a reception terminal of the second reception filter, wherein the reception terminal of the second reception filter is closer to a second side of the circuit board than the reception terminal of the first reception filter, wherein the reception terminal of the first reception filter is closer to the first side of the circuit board than a transmission terminal of the first transmission filter, and wherein the reception terminal of the second reception filter is closer to the second side of the circuit board than a transmission terminal of the second transmission filter.

7. The high-frequency front-end circuit according to claim 2, wherein the first duplexer and the second duplexer are surface mount devices and are mounted on a circuit board, wherein a reception terminal of the first reception filter is closer to a first side of the circuit board than a reception terminal of the second reception filter, wherein the reception terminal of the second reception filter is closer to a second side of the circuit board than the reception terminal of the first reception filter, wherein the reception terminal of the first reception filter is closer to the first side of the circuit board than a transmission terminal of the first transmission filter, and wherein the reception terminal of the second reception filter is closer to the second side of the circuit board than a transmission terminal of the second transmission filter.

8. The high-frequency front-end circuit according to claim 3, wherein the first duplexer and the second duplexer are surface mount devices and are mounted on a circuit board, wherein a reception terminal of the first reception filter is closer to a first side of the circuit board than a reception terminal of the second reception filter, wherein the reception terminal of the second reception filter is closer to a second side of the circuit board than the reception terminal of the first reception filter, wherein the reception terminal of the first reception filter is closer to the first side of the circuit board than a transmission terminal of the first transmission filter, and wherein the reception terminal of the second reception filter is closer to the second side of the circuit board than a transmission terminal of the second transmission filter.

9. The high-frequency front-end circuit according to claim 4, wherein the first duplexer and the second duplexer are surface mount devices and are mounted on a circuit board, wherein a reception terminal of the first reception filter is closer to a first side of the circuit board than a reception terminal of the second reception filter, wherein the reception terminal of the second reception filter is closer to a second side of the circuit board than the reception terminal of the first reception filter, wherein the reception terminal of the first reception filter is closer to the first side of the circuit board than a transmission terminal of the first transmission filter, and wherein the reception terminal of the second reception filter is closer to the second side of the circuit board than a transmission terminal of the second transmission filter.

10. The high-frequency front-end circuit according to claim 5, wherein the first duplexer and the second duplexer are surface mount devices and are mounted on a circuit board, wherein a reception terminal of the first reception filter is closer to a first side of the circuit board than a reception terminal of the second reception filter, wherein the reception terminal of the second reception filter is closer to a second side of the circuit board than the reception terminal of the first reception filter, wherein the reception terminal of the first reception filter is closer to the first side of the circuit board than a transmission terminal of the first transmission filter, and wherein the reception terminal of the second reception filter is closer to the second side of the circuit board than a transmission terminal of the second transmission filter.

* * * * *